US010599494B2

(12) United States Patent
Tan et al.

(10) Patent No.: US 10,599,494 B2
(45) Date of Patent: Mar. 24, 2020

(54) METHOD AND SYSTEM OF PERFORMING INTER-PROCESS COMMUNICATION BETWEEN OS-LEVEL CONTAINERS IN USER SPACE

(71) Applicant: Huawei Technologies Co., Ltd., Shenzhen (CN)

(72) Inventors: Yin Tan, Waterloo (CA); Dong Jin Kim, Gyeonggi (KR); Alan Pak-Lun Ho, Unionville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 15/167,676

(22) Filed: May 27, 2016

(65) Prior Publication Data

US 2017/0344408 A1 Nov. 30, 2017

(51) Int. Cl.
| G06F 7/04 | (2006.01) |
| G06F 12/00 | (2006.01) |
| G06F 12/14 | (2006.01) |
| G06F 13/00 | (2006.01) |
| G06F 17/00 | (2019.01) |
| G11C 7/00 | (2006.01) |
| G06F 9/54 | (2006.01) |
| G06F 21/44 | (2013.01) |
| G06F 21/62 | (2013.01) |

(52) U.S. Cl.
CPC .............. G06F 9/546 (2013.01); G06F 9/544 (2013.01); G06F 9/545 (2013.01); G06F 21/44 (2013.01); G06F 21/6281 (2013.01); G06F 2221/2129 (2013.01)

(58) Field of Classification Search
CPC .......... G06F 9/544; G06F 9/545; G06F 9/546; G06F 21/44; G06F 221/2129
See application file for complete search history.

(56) References Cited

U.S. PATENT DOCUMENTS

| 6,385,658 B2 | 5/2002 | Harter, Jr. et al. | |
| 7,152,231 B1 * | 12/2006 | Galluscio | G06F 9/544 |
| | | | 719/312 |
| 9,274,861 B1 * | 3/2016 | Karppanen | G06F 9/544 |
| 2004/0193906 A1 * | 9/2004 | Dar | H04L 29/06 |
| | | | 726/13 |

(Continued)

FOREIGN PATENT DOCUMENTS

| CN | 1595363 A | 3/2005 |
| CN | 1954293 A | 4/2007 |
| CN | 104216862 A | 12/2014 |

OTHER PUBLICATIONS

"The Integration of Virtual Memory Management and Interprocess Communication in Accent", Robert Fitzgerald and Richard F. Rashid, Carnegie-Mellon University, vol. 4, No. 2 May 1986 (Year: 1986).*

Primary Examiner — Mahfuzur Rahman
Assistant Examiner — Darshan I Dhruv
(74) Attorney, Agent, or Firm — Slater Matsil, LLP

(57) ABSTRACT

A computer-implemented method of performing inter-process communication includes a first process in a first operating system (OS) level container in a user space sending a message to a buffer process. The message is addressed to a second process in a second OS-level container in the user space. The buffer process communicates the message to the second process. A device for performing the computer-implemented method is also provided.

19 Claims, 9 Drawing Sheets

(56) References Cited

U.S. PATENT DOCUMENTS

| | | | |
|---|---|---|---|
| 2004/0226023 A1* | 11/2004 | Tucker | G06F 9/54 719/315 |
| 2005/0204360 A1* | 9/2005 | Meleshchuk | G06F 9/544 719/314 |
| 2007/0011687 A1* | 1/2007 | Ilik | G06F 9/546 719/313 |
| 2007/0130621 A1* | 6/2007 | Marinescu | G06F 21/52 726/22 |
| 2007/0266392 A1 | 11/2007 | Thoelke | |
| 2007/0288682 A1* | 12/2007 | Czajkowski | G06F 9/544 711/2 |
| 2009/0119676 A1* | 5/2009 | Supalov | G06F 9/544 719/312 |
| 2010/0049876 A1* | 2/2010 | Pope | H04L 49/90 709/250 |
| 2010/0083281 A1* | 4/2010 | Malladi | H04L 67/34 719/317 |
| 2011/0161620 A1* | 6/2011 | Kaminski | G06F 12/1009 711/207 |
| 2011/0185100 A1* | 7/2011 | Supalov | G06F 9/544 710/305 |
| 2012/0054875 A1* | 3/2012 | Antill | G06F 8/65 726/28 |
| 2013/0268997 A1* | 10/2013 | Clancy, III | G06F 21/53 726/1 |
| 2014/0059566 A1* | 2/2014 | Benedek | G06F 9/544 719/313 |
| 2014/0149775 A1* | 5/2014 | Ware | G06F 1/3293 713/323 |
| 2015/0067674 A1* | 3/2015 | Melander | H04L 49/70 718/1 |
| 2015/0074683 A1* | 3/2015 | Singh | H04L 47/11 719/312 |
| 2015/0347743 A1 | 12/2015 | Magee et al. | |
| 2017/0366551 A1* | 12/2017 | Brandwine | H04L 47/70 |
| 2019/0149406 A1* | 5/2019 | Fratini | G06F 9/5077 |

* cited by examiner

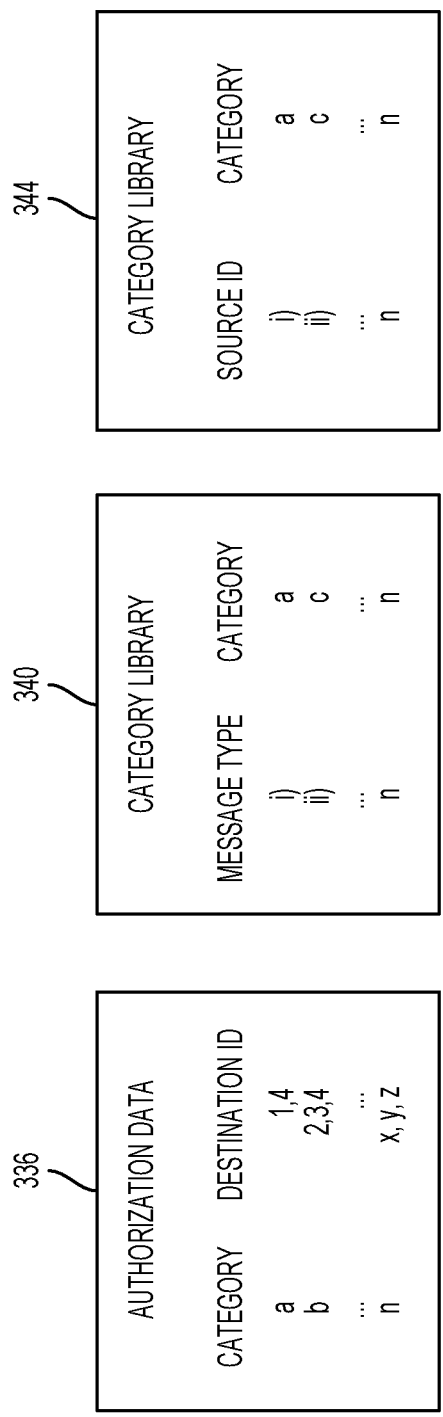

METHOD AND SYSTEM OF PERFORMING INTER-PROCESS COMMUNICATION BETWEEN OS-LEVEL CONTAINERS IN USER SPACE

TECHNICAL FIELD

The improvements generally relate to methods and systems of performing inter-process communication between OS-level containers in user space.

BACKGROUND

Computers today (e.g. PCs, smartphones, servers) typically have an operating system that manages computer hardware and software resources. Application programs typically require an operating system to function on a computer.

Various types of operating systems (OSs) exist, such as Unix™ and Unix-like, OS X™, iOS™, Linux™, Android™, Windows™, etc. The selection of an operating system can be made based on the given computer's architecture (compatibility), performance requirements and user preferences, for instance. It is common for operating systems to manage memory by virtual allocation in order to optimize resource usage.

A typical operating system allocates memory to different processes. As shown in FIG. 1, an operating system can segregate virtual memory 10 into user space 12 and kernel space 14. The kernel space 14 is reserved for specific operations associated with the kernel 16. The kernel 16 is a central core of the operating system and houses core programs 18. Application programs typically operate in user space 12.

Operating systems can allow multiple virtualized user space instances, which will be referred to herein as containers 20, 22. Communication between processes in user space is known as inter-process communication (IPC). Processes that send IPC to each other are messaging "endpoints". Operating systems typically allow communication between processes running within a given container (container-local messaging), using IPC that is local to the container. Operating systems also allow communication 28 between processes 24, 26 running in different containers 20, 22 (inter-container messaging). Inter-container messaging uses IPC that is implemented both within and outside local containers.

Inter-container messaging is typically highly restricted, due to security or business considerations. Inter-container messaging can be restricted to specific combinations of processes or containers. There is a need to improve security and efficiency of inter-container messaging.

SUMMARY

In accordance with a first aspect, a computer-implemented method of performing inter-process communication includes a first process in a first operating system (OS) level container in a user space sending a message to a buffer process. The message is addressed to a second process in a second OS-level container in the user space. The buffer process communicates the message to the second process.

In a further aspect, the buffer process determines that a communication is authorized between the first process and the second process. The buffer process communicates the message to the second process based on the determination.

In a further aspect, the message is further addressed to a third process in a third OS-level container in the user space. The buffer process communicates the message to the third process.

In a further aspect, the second process receives the message from the buffer process.

In a further aspect, the message is communicated from the buffer process to the second process via an intermediate process in a distinct container in said user space.

In a further aspect, the first process sends a kernel message to the buffer process. The buffer process communicates the kernel message to the kernel space process.

In a further aspect, determining that the communication is authorized is based on authorization data.

In a further aspect, the buffer process receives a request to update the authorization data. The buffer process determines that the requested update to the authorization data is authorized. The authorization data is updated based on the determination that the requested update is authorized.

In a further aspect, the buffer process operates in the first OS-level container.

In a further aspect, the buffer process operates in the second OS-level container.

In a further aspect, the buffer process operates in a distinct OS-level container in user space.

In a further aspect, the step of communicating the message includes routing the message to the second process.

In a further aspect, the first process serializes the message by including a source identifier (ID) and a destination ID with a payload in a data packet of the message. The buffer process determines that the communication is authorized based on the source ID and the destination ID.

In a further aspect, said second process fetches the message from the buffer process and deserializes the message.

In a further aspect, the buffer process determines that the communication is authorized based on an identifier (ID) of the second process and a category associated with the message.

In a further aspect, the buffer process receives a request to update the authorization data, and updates said authorization data upon determining that the request is authorized.

In a further aspect, the buffer process communicates a request to update a library to at least one of said first and second processes.

In accordance with a second aspect, a device has at least one processor; and a non-transitory computer-readable memory storing instructions that, when executed by the at least one processor, cause the at least one processor to: send, by a first process in a first operating system (OS) level container in a user space, a message to a buffer process, the message being addressed to a second process in a second OS-level container in the user space; and communicate, by the buffer process, the message to the second process.

In a further aspect, the instructions further cause the at least one processor to determine, by the buffer process, that a communication is authorized between the first process and the second process. The buffer process communicates the message to the second process based on the determination.

In a further aspect, the device is one of a hand-held device, a personal computer and a server.

BRIEF DESCRIPTION OF THE DRAWINGS

In the figures,

FIG. 7B shows further detail of an authorization table of the example of FIG. 8A;

FIG. 7C shows further detail of a category library of the example of FIG. 8A; and FIG. 8 shows a second embodiment of a category library.

DETAILED DESCRIPTION OF ILLUSTRATIVE EMBODIMENTS

Figure 1:
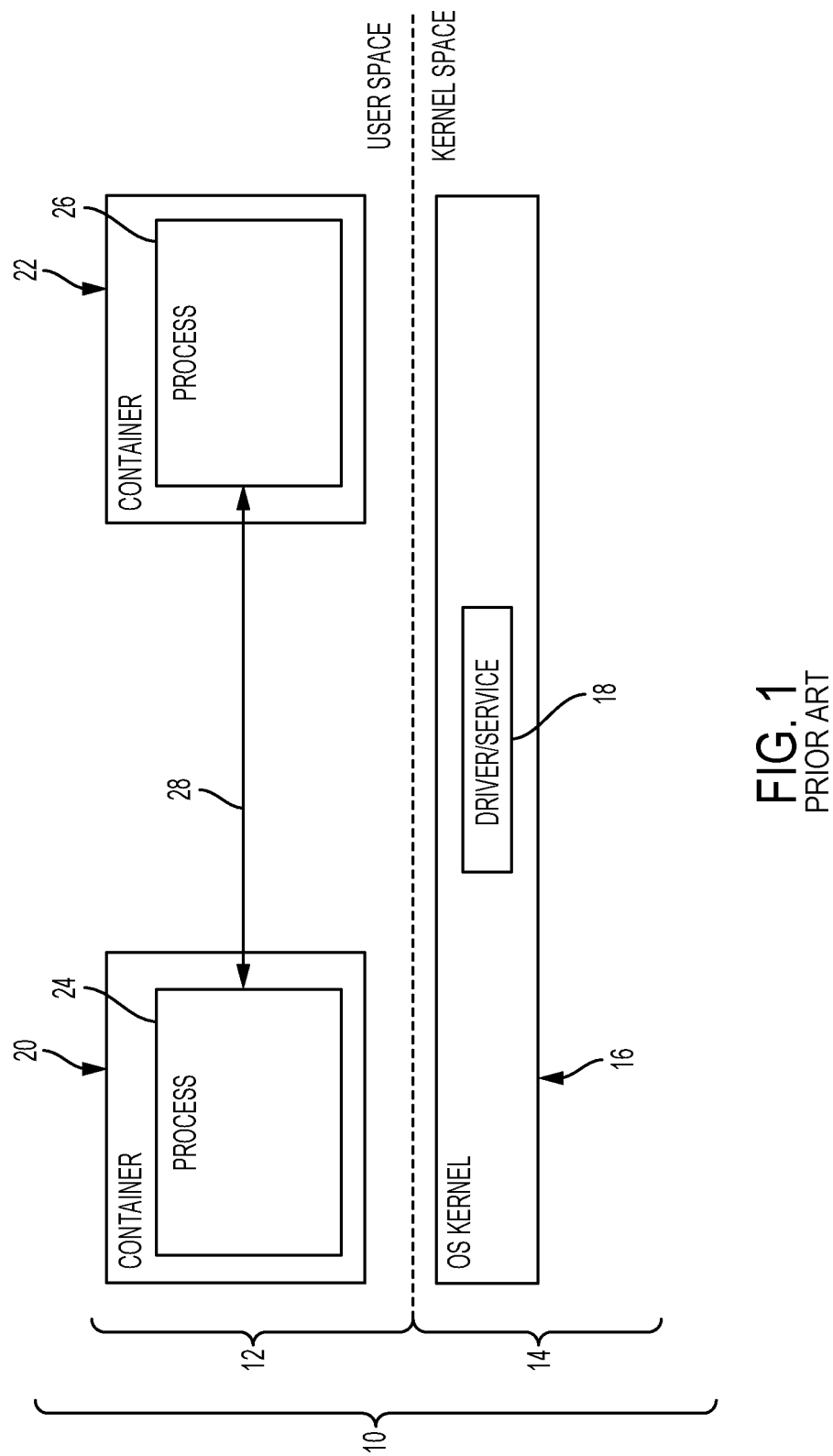
FIG. 1 is a block diagram of an example of inter-process communication in which processes communicate directly between two different containers.

In the embodiment illustrated, all communications between processes 128, 130, 136, 138, 140 and the core programs 118 are performed via the buffer process 132. Although this additional functionality is optional, it can be advantageous in at least some embodiments for security considerations.

In this example, communication between a first process 128 in a first container 120, and a second process 130 in a second container 122, is performed via a buffer process 132 and which controls the communication between the first process 128 and the second process 130. The communication between the first process 128 and the second process 130 is contingent upon a determination that the communication between the first process 128 and the second process 130 is authorized. The determination may be a determination that the first process 128 and the second process 130 are authorized to communicate with each other, or it may be a determination that the communication of a particular message is authorized based on properties of the message. The determination is made by the buffer process 132. In other embodiments, the determination that the communication is authorized is made by a separate process, and the buffer process 132 receives an indication that the communication is authorized. In other embodiments, the buffer process 132 permits the communication without making any, determination regarding authorization. The determination can be based on authorization data 134 made accessible to the buffer process 132. The authorization data 134 can dictate restrictions. The restrictions can specify combinations of processes and/or containers which are allowed to communicate. The restrictions can further or alternatively specify particular types of communications which are allowed for specific process or container combinations.

Figure 3:
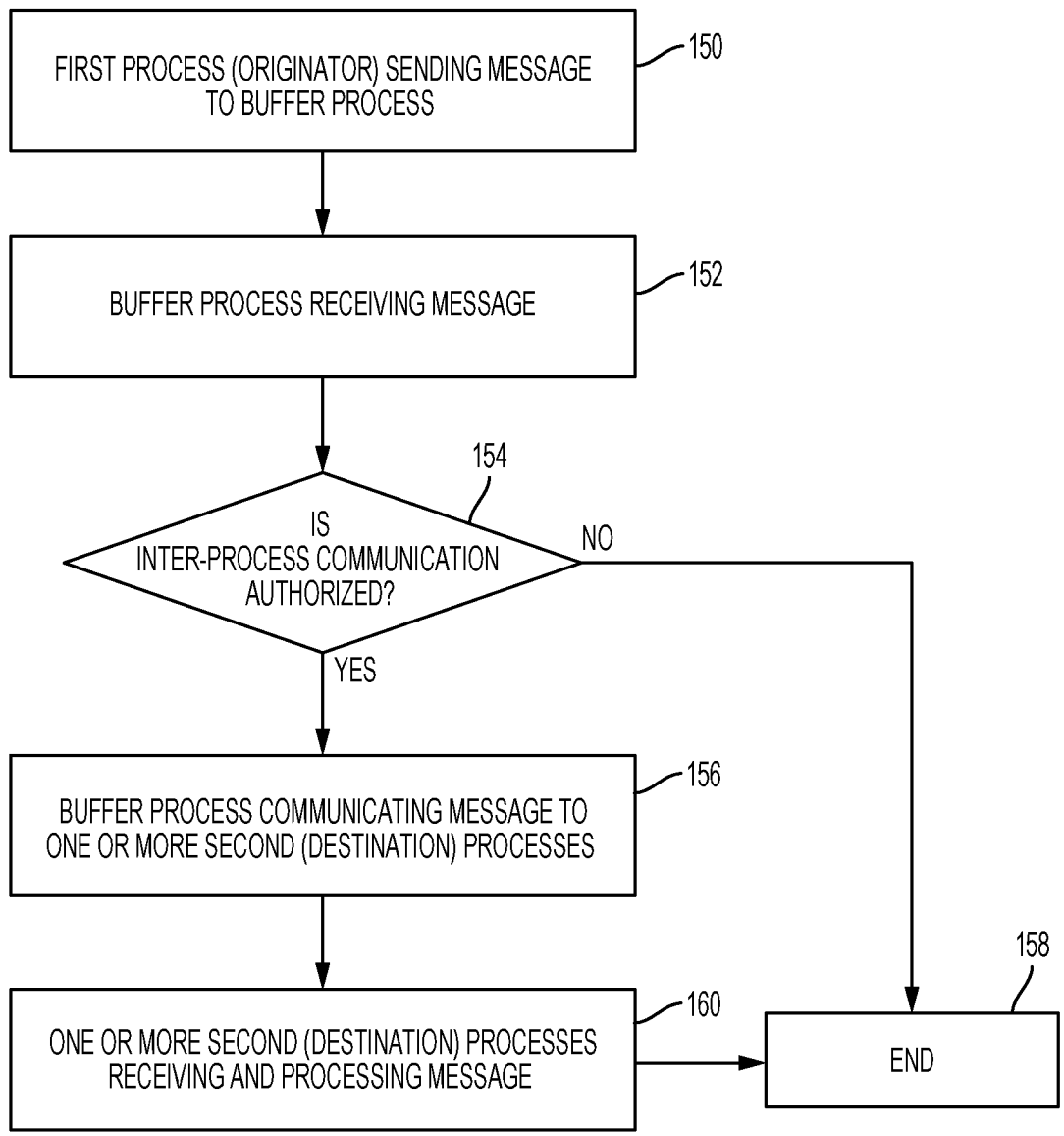
FIG. 3 is a flow chart of inter-process communication in which processes communicate via a buffer process.

FIG. 3 is a flow chart showing an example method of performing inter-process communication between the first process 128 and the second process 130. The first process 128 is the source of the message, and the second process 130 is the destination of the message. In step 150, the first process 128 sends the message to a buffer process 132. In step 152, the buffer process 132 receives the message. In step 154, the buffer process 132 determines if inter-process communication is authorized. In step 156, the buffer process 132 communicates the message to one or more destination processes (e.g. the second process 130). The communication of the message to one or more destination processes is based on a determination that the inter-process communication is authorized, which determination will be discussed below in further detail. If inter-process communication is not determined to be authorized, the flow chart ends 158. In step 160, the one or more destination processes receive and process the message. The flow chart then ends 158.

In some embodiments, a message is returned from the second process to the first process. This can be performed by following the same method steps but with the second process as the source and the first process as the destination.

Referring back to FIG. 2, various specific inter-container communication paths can be controlled by the buffer process 132. Examples of communication paths will now be provided for the purpose of illustration. For instance, process 130 can communicate a message to two processes 136, 138 running in container 124 via the buffer process 132. Process 130 can communicate a message to one process 136 in container 124 and to one process 128 in container 120. Process 128 can communicate a message to process 140 via the buffer process 132, and then via process 130. Process 140 can communicate with one or more of processes 128, 136, 138 and 122 first via process 130 and then via buffer process 132. As can be understood from the preceding examples, depending on the embodiment, the communication via the buffer process 132 can be allowed between selected pairs of processes 128, 130, 136, 138, 140. Alternatively, the communication via the buffer process 132 can be allowed from one of the processes 128, 130, 136, 138, 140 to two or more of the other ones of the processes 128, 130, 136, 138, 140. Various additional examples of inter-container communication will be apparent to those having ordinary skill in the art. The process 128, 130, 136, 138, 140 from which the message is received can be referred to as the source process. The process(es) 128, 130, 136, 138, 140 to which the message is destined can be referred to as the destination process(es).

This form of communication can benefit from dynamic update (i.e. updating during runtime). Some examples of dynamic updates are starting or terminating processes; and starting, suspending, resuming, or terminating containers. Dynamic update can include updating authorization conditions. The update request can be communicated to the buffer process 132. The buffer process 132 can, in response, update the authorization data 134. In some embodiments, the buffer process 132 can further send a message to one or more of the processes 128, 130, 136, 138, 140 to update a library of the given process(es) 128, 130, 136, 138, 140. The buffer process 132 can be provided with various forms of security features based on the specifics of an embodiment.

Figure 2:
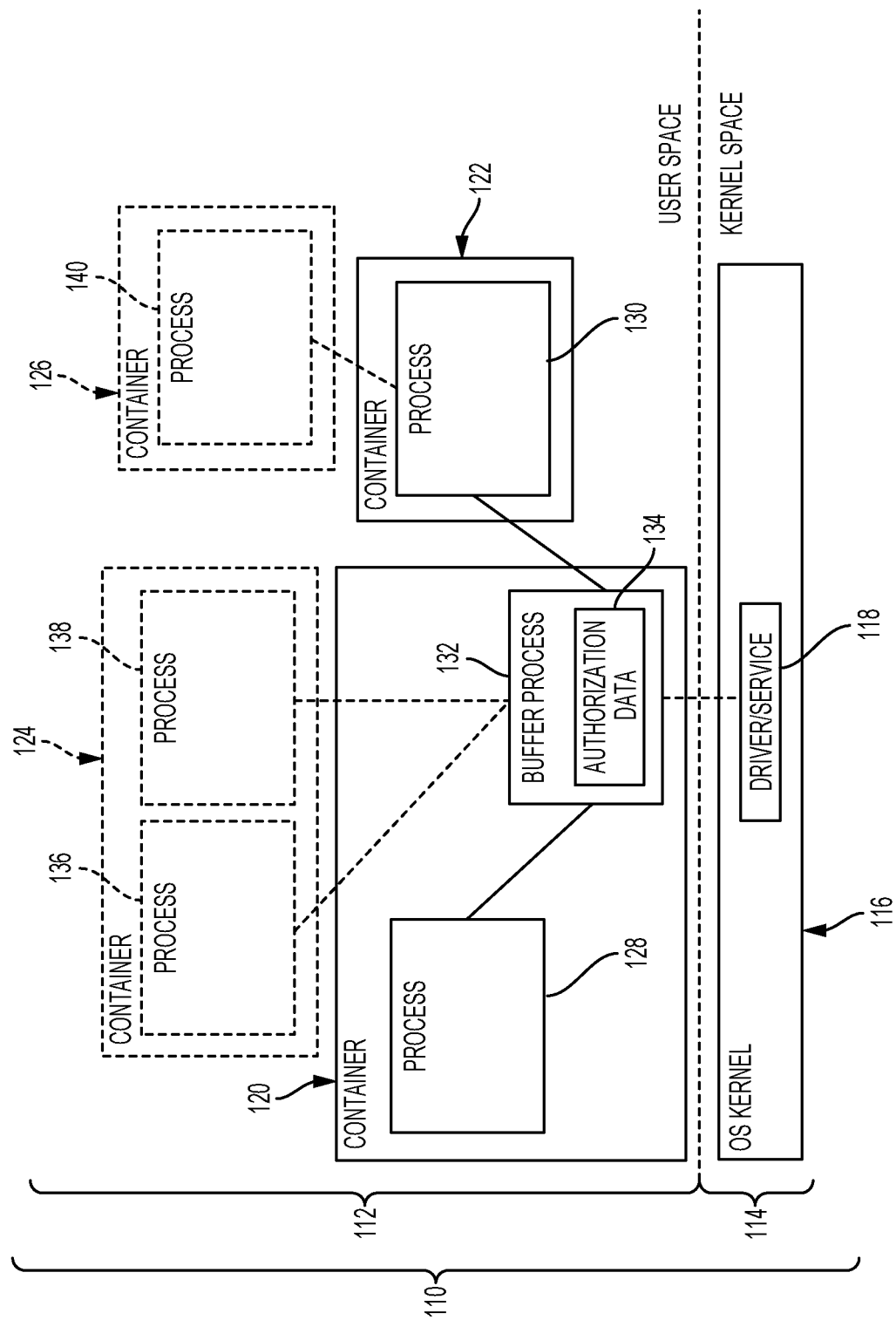
FIG. 2 is a block diagram of another example of inter-process communication in which processes communicate via a buffer process.

FIG. 2 shows an embodiment in which the buffer process 132 runs in a container 120 having a process 128 which can request inter-container communication. It will be understood that in an alternative embodiment, the buffer process 132 can run in a distinct container (see FIGS. 4A and 7A). The container 120 in which the buffer process 132 is running can have the capability to control the life cycle of other containers, such as containers 122, 124, 126. For instance, the container 120 can have a level of authorization allowing control of the starting, suspending, resuming, and terminating of the other containers 122, 124, 126. In still another embodiment, the buffer process 132 can run in kernel space.

It will be noted here that one or more containers 120, 122, 124, 126 can have more privileges than others. The functionality of adding containers is typically restricted to certain specific applications, such as a mobile device management (MDM) application for example. In one embodiment, it can be preferred to run the buffer process within a high-privilege container having one or more specific applications.

The inter-process communication can be authorized or restricted in different manners. For instance, the authorization can be container based, in which case all communications can be allowed between specific container combinations. Alternatively, the authorization can be process based, in which case all communications can be allowed between specific process combinations. Further restrictions can be provided. For instance, communication between certain processes or containers can be limited to certain types of communication.

In the embodiment illustrated, all communications between processes 128, 130, 136, 138, 140 and the kernel processes 118 are performed via the buffer process 132. Although this additional functionality is optional, it can be advantageous in at least some embodiments for security considerations.

The buffer process 132 can be provided with additional functions. For instance, the buffer process 132 can be provided with resource management functions to manage kernel resources. The buffer process 132 may be able to generate authorization data 134. For instance, the buffer process 132 can generate a request to update the authorization data 134. Such a function can be used by the buffer process in establishing inter-process communication between a new combination of processes and/or containers. The buffer process can create or duplicate an existing inter-process communication. The buffer process can also authorize or restrict inter-process communication between one or more specific combination of processes and/or containers. Alternatively, a request to update the authorization data can come from another source, such as another process or container.

Depending on the specific embodiment, the implementation details can vary. For instance, in embodiment 1 which is presented below, the buffer process communicates the message to the second process by sending the message to the server. In embodiment 2 which is presented below, the buffer process communicates the message to the second process by hosting the message and making it available for fetching by the second process. In this embodiment, the hosted message can be associated with a message category, and the authorization of specific processes can be limited to one or more specific categories. Authorization can be based on authorization data listing matching addresses or categories, and updating the inter-process communication can require updating the authorization data.

Inter-process communication can take various forms, such as establishing network sockets or shared memory. Alternatively, inter-process communication via the buffer process 132 can be implemented using application programming interfaces (APIs) which can also be used by the communicating processes, for instance. APIs can be used to add a signature to the message, and the authorization can be determined based on the signature, for instance. In this scenario, implementing dynamic update can involve updating the API, for instance.

Example 1

Figure 4A:
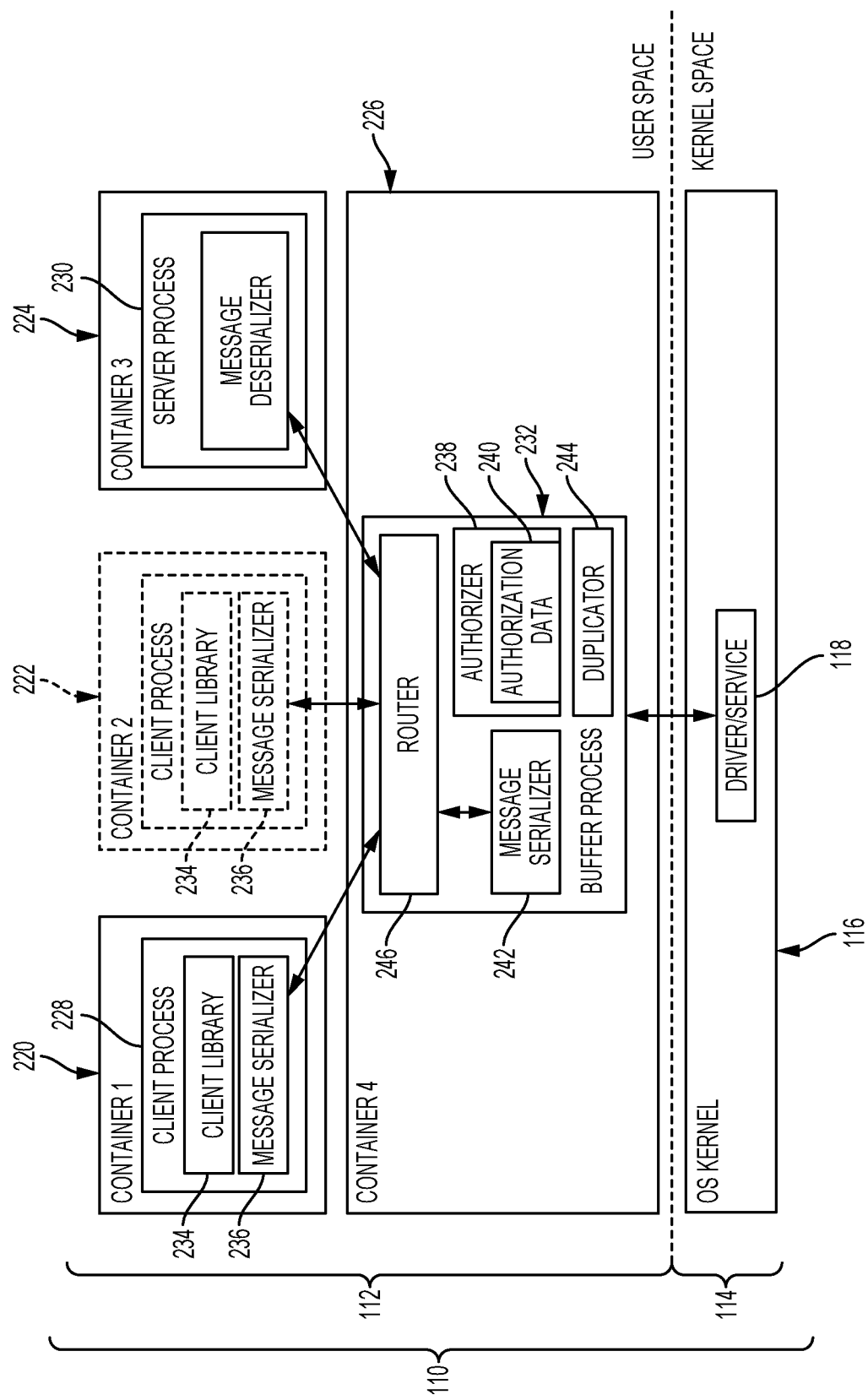
FIG. 4A is a block diagram of an example of inter-process communication in accordance with a first embodiment.
Figure 4B:
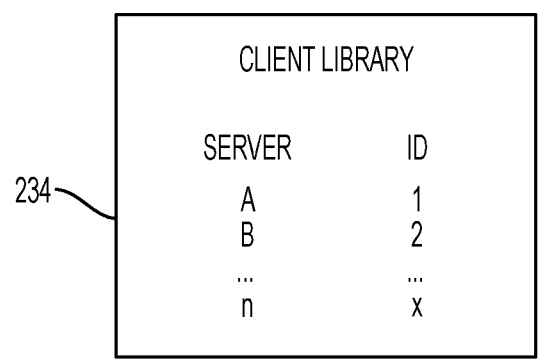
FIG. 4B shows further detail of a client library of the example of FIG. 4A.
Figure 4C:
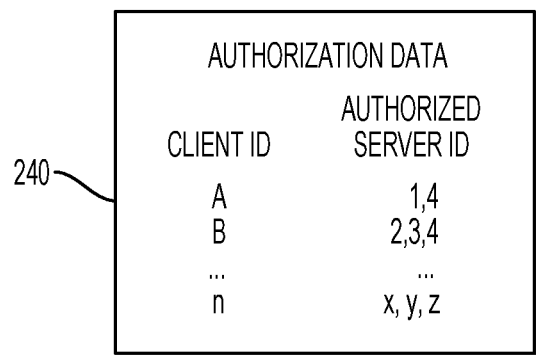
FIG. 4C shows further detail of an authorization table of the example of FIG. 4A.

An example embodiment will be discussed in relation with the example presented in FIGS. 4A to 4C. In this example, a number of containers 220, 222, 224, 226, are provided in the user space 112. In this example, the communication is established between a first process 228 and at least a second process 230, via a buffer process 232. The communication is received from the first process 228, which can be considered a client process 228. The client process 228 is the source of a given inter-container communication instance. The destination of the communication is the second process 230, which can be considered a server process. In typical applications, processes can act as both clients and servers but in some cases processes can be configured to operate only as one or the other. The buffer process 232 acts as an intermediary between the client process 228 and the server process 230.

Referring back to FIG. 3, to perform the step 150 of sending the message to the buffer process 232, the client process 228 first accesses a client library 234 which has data indicating the availability of the server process 230. FIG. 4B provides an example of a client library 234. In this example, the message is serialized as the payload of a data packet by a serializer 236. The destination identifier (ID) can be included in the data packet in the form of an addressing header. The source ID can also be included in the addressing header.

The step 152 of receiving the message can further include the buffer process 232 determining the destination ID and the source ID. This can involve deserializing the data packet and reading the addressing header, for instance.

In an alternative embodiment, the determination of the source ID and the destination ID can be socket-based. For instance, the operating system can be provided with a socket API which allows processes to use local or remote network sockets for the communication. Accordingly, by binding the socket to an ID in the form of an address, the socket can be used to receive data sent to that address. In some embodiments, the buffer process 232 can determine the source ID based on the socket. Accordingly, the source ID can be determined by the buffer process 232 based on the source (e.g. port in the case of a TCP/IP socket, or absolute socket path for a Unix socket) of the message rather than by reading an addressing header. Moreover, the buffer process 232 can have a function to automatically establish a destination for the message based on the client ID, which can serve as a form of authorization determination. The buffer process 232 can determine the source ID and destination ID based on the details of implementation of how the communication is established between the buffer process 232 and the client process 228. For instance, if the communication between the buffer process 232 and the client process 228 is established with a TCP socket, the destination ID can be determined from the port number allocated to the container 230. If the communication between the buffer process 232 and the client process 228 is established with a Unix socket, the destination ID can be determined from the path. Accordingly, the inter-process communication can be established without the inclusion of a source ID or of a destination ID within the message.

Referring back to FIG. 3, the step 154 of determining whether inter-process communication is authorized is performed by an authorizer 238 function of the buffer process 232. The authorizer 238 has access to authorization data which acts as a reference to determine whether the source ID and the destination ID are authorized for the inter-process communication. In this example, the authorization data is provided in the form of an authorization table 240 linking authorized server IDs to specific client IDs. The authorizer 238 can look up the authorization table 240 in a suitable manner to determine whether or not the client and server are authorized to communicate. An example of an authorization table 240 is presented in FIG. 4C.

The step 156 of communicating the message to the destination process can include serializing the message in the form of a payload of a data packet. This can further involve including an addressing header. This can be done by a message serializer 242, which can have the added functionality of de-serializing incoming data packets.

The step 160 of the buffer process receiving the message can include deserializing the message. Deserializing is performed by a deserializer 242. In this example, the buffer process 232 is provided with the capability of transmitting a message to more than one destination. Accordingly, the buffer process 232 is provided with a duplicator 244 function. Moreover, the buffer process 232 is provided with a router 246 function to allow sending the message to a selected one, or more, of the server processes 230. The function of routing the message to a selected one or more of the server processes 230 can include changing addressing headers of the message depending on the identification scheme and the other particularities of a given embodiment.

Figure 5:
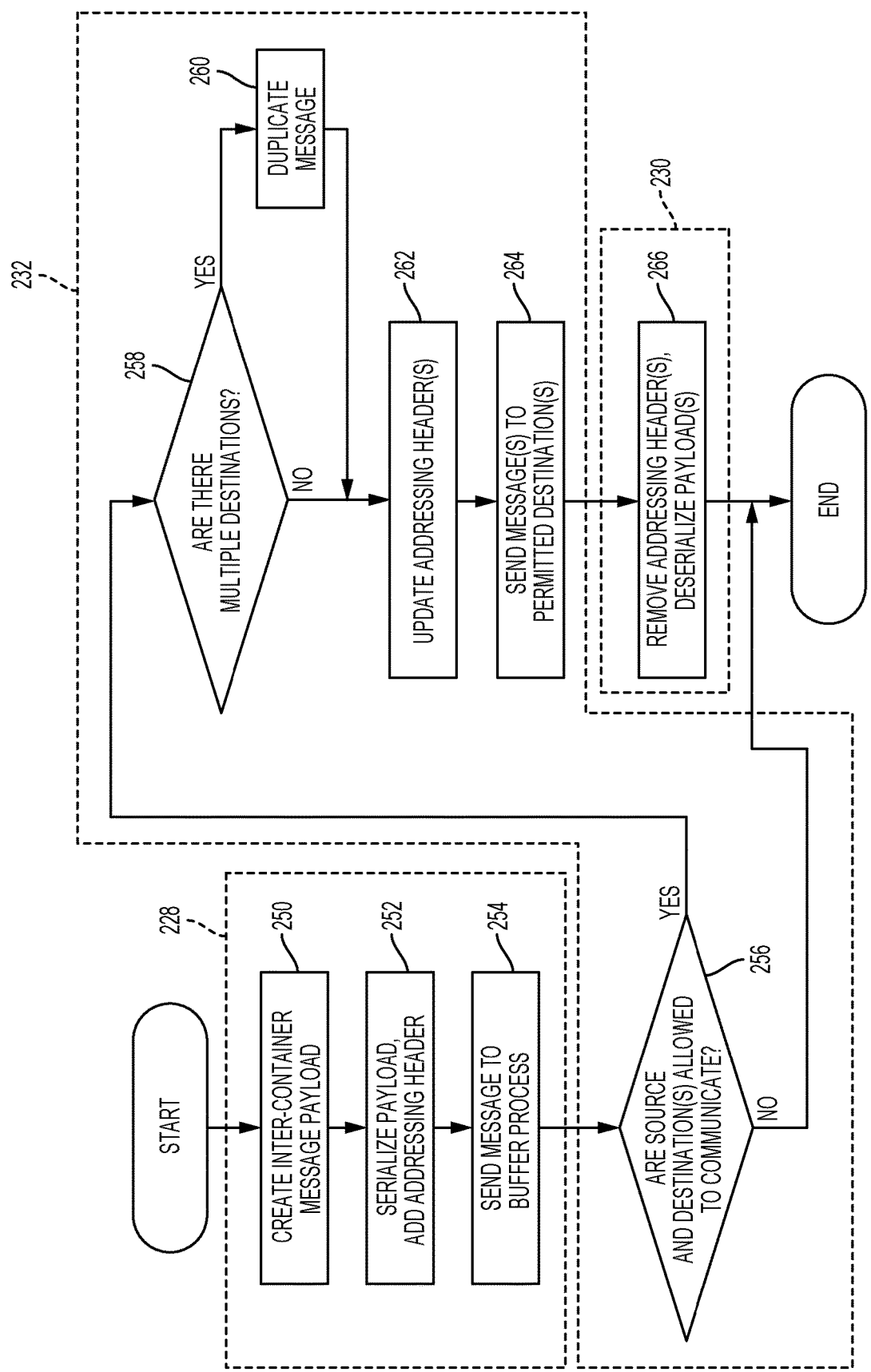
FIG. 5 is a flow chart of inter-process communication in accordance with the example of FIG. 4A.

FIG. 5 shows a flow chart of a specific example in which the source ID and the destination ID are included in an addressing header of the data packet containing the message payload. In this example, the client process 228 creates the inter-container message payload 250, serializes the payload, adds the addressing header 252 and sends the message to the buffer process 254. The buffer process 232 determines whether or not the source and the destination(s) are allowed to communicate 256. The message destination is parsed. A determination 258 is made as to whether or not there are multiple destinations, in which case the message is duplicated 260. The buffer process 232 then updates 262 the addressing header(s) and routes 264 the message to the permitted destinations. The header's source and destination fields can both be updated. Each destination deserializes the payload 266. The addressing header can be partially or entirely removed. In some cases, the source ID can be stored for later retrieval, for example to send a reply message to the original sender.

Accordingly, as described above, point-to-point connections can be established by a buffer process 232 which can act as a central router that audits the messages and directs the messaging in a star-like topology. This topology can reduce security vulnerabilities by having reduced attack surfaces.

Moreover, centralizing communication control can allow a significant degree of flexibility to deal with updates. Updates can be in the form of updates to authorization conditions (e.g. amendments to the authorization data) and/ or in the form of the addition or subtraction of processes. In the described topology, the number of communication connections between processes scales linearly with additional processes. New processes or containers can be added during runtime. Communicating between processes via a buffer process simplifies the addition of new processes and containers. New processes can use the buffer process to communicate with other containers, without the need to perform discovery of all of the containers or negotiating communication and security parameters with each container individually. The fact that process identifiers are abstracted with the addressing header, for instance, can provide for relatively simple dynamic addition of message recipients.

Figure 6:
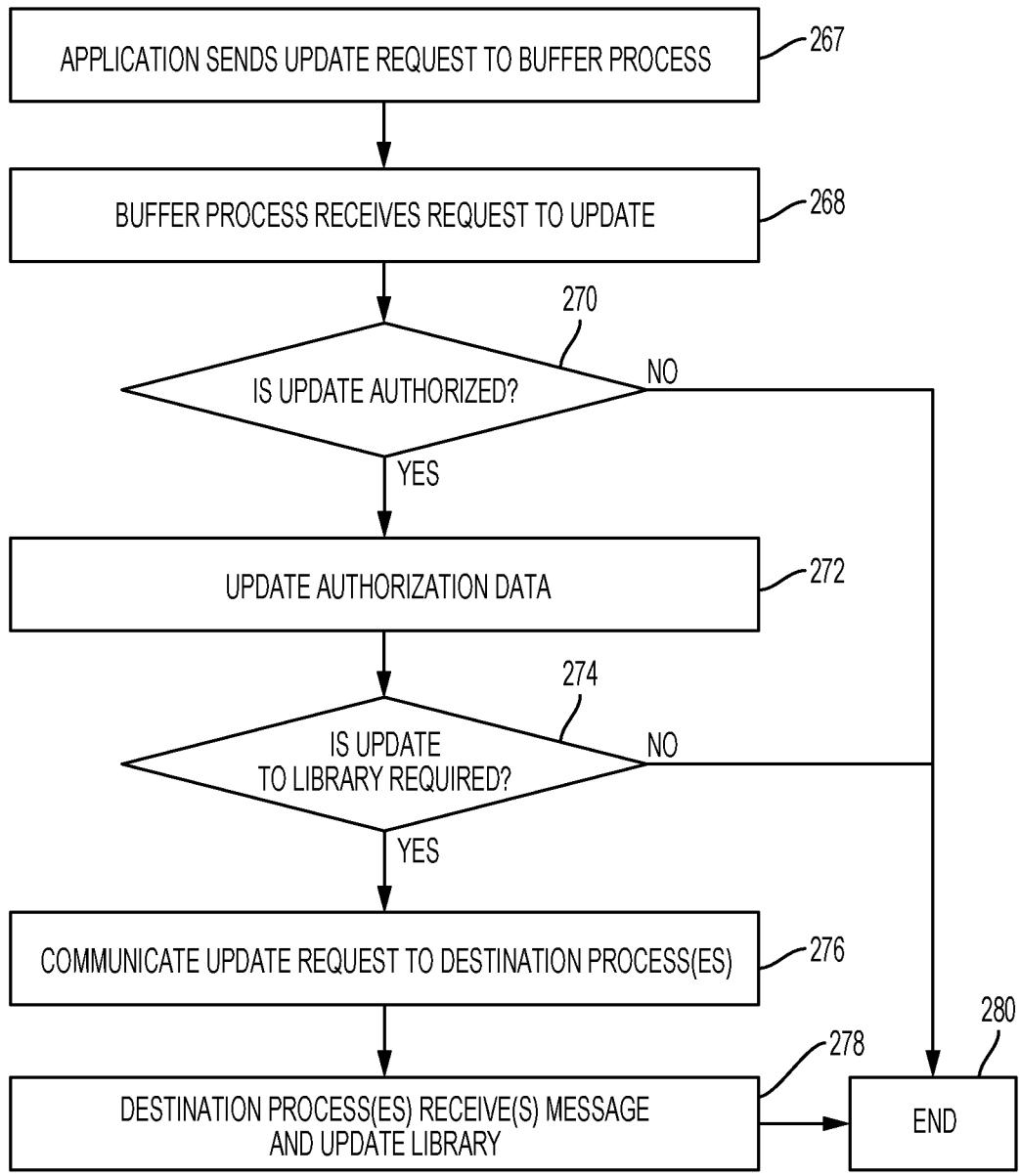
FIG. 6 is a flow chart of updating authorization conditions in the context of inter-process communication via a buffer process.

An example flow chart of a method of performing an update is presented in FIG. 6. This method can be applied to the embodiment shown in FIG. 4A. The update is typically initiated by an application running in the operating system user space 112. In step 267, an application sends an update request to the buffer process 232. The update request includes update data as part of the message payload. The update data can include changes to authorization conditions (authorization data) and/or the addition of a new process. The buffer process 232 receives 268 the request to update. The buffer process 232 determines 270 whether or not the update is authorized. In one embodiment, this determination 270 is made by checking the source application's identification against the authorization data. If the message is authentic, the authorization data is updated 272, if required. The buffer process 232 can also determine 274 whether or not an update to a library is required. For instance, if the updates include the addition of one or more new server processes, the client library is updated to list the new server processes. If an update to a library is required, the buffer process 232 can communicate the update request to the client processes. The client processes receiving 278 the update request then updates its library. The update method can then end 280.

Accordingly, the embodiment presented above can provide inter-container messaging having dynamic operation capability, including the flexibility to add new processes or containers during runtime. Moreover, this embodiment can provide routing behavior (e.g. broadcast to multiple processes), and centralized control (e.g. for access control/ security).

Example 2

An example embodiment will be discussed in relation with the example presented in FIGS. 7A to 7C. A number of containers 320, 322, 324, 326, are provided in the user space 112. In this example, inter-process communication is established between a first process 328 and at least a second process 330 via a buffer process 332. Referring back to FIG. 3, the first process 328 is the source and the second process 330 is the destination. There can be more than one destination process. The first process 328 sends a message to the buffer process 332. The second process 330 actively fetches messages made available to it from the buffer process 332. The buffer process 332 communicates 156 the message by hosting it and making it accessible for fetching by the second process 330. It is contemplated that the message may have more than one destination process. The message is assigned a category. The buffer process 332 determines 154 if a specific second process 330 has access to a given message based on the message's category. More specifically, the buffer process 332 controls access in a manner that each message category is made available to a specific process, or to a specific combination (subset) of processes.

The access of messages is controlled by an authorizer 334 function of the buffer process 332. The messages can be stored in the form of message data 338 in a memory made accessible to the authorizer 334, and the message data can include one or more categories 339a, 339b, . . . , 339n. The buffer process 332 acts as an intermediary between the first process 328 and the second process 330.

In one example, the authorizer 334 controls the access of the destination processes to given message categories 339a, 339n based on authorization data in the form of an authorization table 336. An example of an authorization table 336 is presented in FIG. 7B. The authorization table 336 links authorized destination IDs to specific categories. The details can vary depending on the specific implementation.

In the example shown, a category can be associated to a message a priori, by the first process 328, and the category can be included in the message. This category attribution can be based on a category library 340 in a memory made accessible to the first process 328. An example of a category library 340 is shown in FIG. 7C, and can be seen to be provided in the form of a table listing types of messages which can be formulated by the first process 328 and the corresponding category which can be attributed based on the message type.

In a variant, a category can be associated to the message a posteriori, once the message has been received by the buffer process 332. The buffer process 332 can attribute a category based on factors such as source ID, message type, etc. An example of a category library based on such a variant is shown in FIG. 8. In some embodiments, the message category can be the result of a combination of a category attributed by the source and a category attributed by the buffer process 332.

Source processes do not need to know the existence of the buffer process 332. They simply publish to a given container where the buffer process 332 is running, and the messages are then hosted by the buffer process 332.

The communication can be based on QNX PPS IPC, to name one example.

Figure 7A:
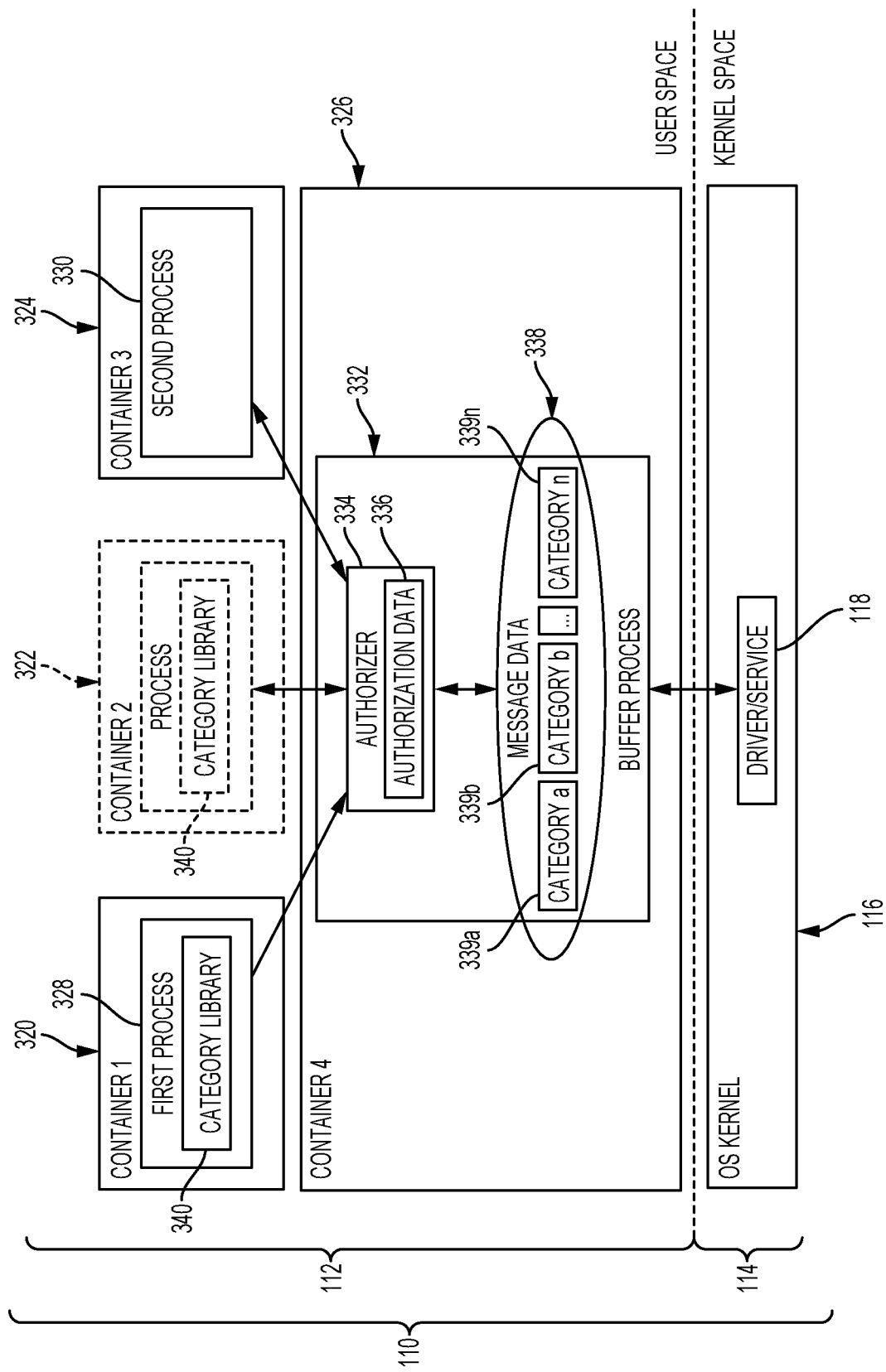
FIG. 7A is a block diagram of an example of inter-process communication in accordance with a second embodiment.

An update to the embodiment shown in FIG. 7A can be performed using the algorithm shown in FIG. 6. The update is typically initiated by an application running in the operating system user space 112. The application sends an update request to the buffer process 332. The update request includes update data. The update data can include changes to authorization conditions (authorization data) and/or the addition of a new process. The buffer process 332 receives 268 the request to update. The buffer process 332 determines 270 whether or not the update is authorized. Based on a determination that the request to update is authorized, the buffer process updates 272 the authorization data, if required. Moreover, the buffer process 332 determines 274 whether the request to update includes an update to the category libraries. If so, the buffer process 332 communicates 376 an update message to the publisher processes. A publisher process receiving the update message can update 278 its category library 340 in a suitable manner, for instance. The update process can then end 280.

As can be understood, the examples described above and illustrated are intended to be examples only. Various alternatives are possible. For instance, the proposed methods can be computer implemented on any suitable computer platform that needs to communicate between OS virtualized containers. Examples of such computers can include mobile devices such as mobile phones or other wireless terminals. Other examples of computers include servers that are enabled for user space virtualization. The choice of an operating system can vary depending on the embodiment. Alternative embodiments can have different configurations of containers and processes. Alternative embodiments can have a greater or lesser number of containers. The scope is indicated by the appended claims.

What is claimed is:

1. A computer-implemented method of performing inter-process communications between processes running within isolated containers provided in a user space of a virtual memory allocated by an operating system (OS) of a device, wherein the virtual memory allocated by the operating system includes a kernel space reserved for a kernel of the OS, and wherein the kernel is segregated from the user space and shared by the isolated containers, the method comprising:

receiving, at a buffer process running within a first isolated container of the isolated containers provided in the user space of the virtual memory, a message sent by a first process running within the first isolated container or a second isolated container of the isolated containers provided in the user space of the virtual memory, the message being addressed to a second process running within a third isolated container of the isolated containers provided in the user space of the virtual memory;

determining, by the buffer process, that inter-process communication is authorized between the first process and the second process based on at least one of authorization data, an identifier (ID) of the second process, or a category associated with the message, wherein the buffer process acts as a central router which routes and authorizes the inter-process communications between the processes running within the isolated containers, wherein the buffer process, the first process running within the first isolated container or the second isolated container, the second process running within the third isolated container, and a third process running within one of the isolated containers form a star topology; and communicating, by the buffer process via inter-container messaging, the message towards the second process based on the determining.

2. The computer-implemented method of claim 1 further comprising:

receiving, by the buffer process, a request to update the authorization data; and determining, by the buffer process, that the request to update the authorization data is authorized; and updating, by the buffer process, the authorization data based on the determining that the request to update is authorized.

3. The computer-implemented method of claim 1, further comprising:

receiving, by the buffer process, a request to update the authorization data; and updating, by the buffer process, the authorization data after determining that the request is authorized.

4. The computer-implemented method of claim 1, wherein the message sent by the first process is serialized as a payload of a data packet that includes a source ID and a destination ID in an addressing header of the data packet, and wherein the buffer process determines that the inter-process communication is authorized based on the source ID and the destination ID.

5. The computer-implemented method of claim 4 further comprising deserializing, by the buffer process, the data packet and reading the addressing header of the data packet to determine the source ID and the destination ID.

6. The computer-implemented method of claim 1 wherein:

the message is further addressed to the third process, and the computer-implemented method further comprises:

communicating, by the buffer process, the message to the third process.

7. The computer-implemented method of claim 1 wherein the buffer process communicates the message by hosting the message and making the message available for fetching by the second process.

8. The computer-implemented method of claim 1 wherein the message is communicated by the buffer process towards the second process via an intermediate process running in a distinct container provided in the user space.

9. The computer-implemented method of claim 1 further comprising:
receiving, by the buffer process, a kernel message sent by the first process running within the first isolated container or the second isolated container; and
communicating, by the buffer process, the kernel message towards the kernel running within the kernel space of the virtual memory.

10. The computer-implemented method of claim 1 wherein the communicating, by the buffer process, includes routing the message to the second process.

11. A device comprising:
at least one processor; and
a non-transitory computer-readable memory storing instructions that, when executed by the at least one processor, cause the at least one processor to perform operations of inter-process communications between processes running within isolated containers provided in a user space of a virtual memory allocated by an operating system (OS) of the device, wherein the virtual memory allocated by the operating system includes a kernel space reserved for a kernel of the OS, and wherein the kernel is segregated from the user space and shared by the isolated containers, the operations comprising:
receiving, at a buffer process running within a first isolated container of the isolated containers provided in the user space of the virtual memory, a message sent by a first process running within the first isolated container or a second isolated container of the isolated containers provided in the user space of the virtual memory, the message being addressed to a second process running within a third isolated container of the isolated containers provided in the user space of the virtual memory;
determining, by the buffer process, that inter-process communication between the first process and the second process is authorized based on at least one of authorization data, an identifier (ID) of the second process, or a category associated with the message, wherein the buffer process acts as a central router which routes and authorizes the inter-process communications between the processes running within the isolated containers, wherein the buffer process, the first process running within the first isolated container or the second isolated container, the second process running within the third isolated container, and a third process running within one of the isolated containers form a star topology; and
communicating, by the buffer process via inter-container messaging, the message towards the second process based on the determining.

12. The device of claim 11 wherein the device is one of a hand-held device, a personal computer, or a server.

13. The device of claim 11 wherein the message sent by the first process is serialized as a payload of a data packet that includes a source ID and a destination ID in an addressing header of the data packet, and wherein the determining that the inter-process communication is authorized is based on the source ID and the destination ID.

14. The device of claim 11 wherein the determining that the inter-process communication is authorized comprises deserializing, la the buffer process, a data packet and reading an addressing header of the data packet to determine a source ID and a destination ID prior to determining that the inter-process communication is authorized based on the source ID and the destination ID.

15. A non-transitory computer readable storage device having instructions stored thereon that, when executed by at least one computing device, cause the at least one computing device to perform operations for inter-process communications between processes running within isolated containers provided in a user space of a virtual memory allocated by an operating system (OS) of the at least one computing device, wherein the virtual memory allocated by the operating system includes a kernel space reserved for a kernel of the OS, and wherein the kernel is segregated from the user space and shared by the isolated containers, the operations comprising:
receiving, at a buffer process running within a first isolated container of the isolated containers provided in the user space of the virtual memory, a message sent by a first process running within the first isolated container or a second isolated container of the isolated containers provided in the user space of the virtual memory, the message being addressed to a second process running within a third isolated container of the isolated containers provided in the user space of the virtual memory;
determining, by the buffer process, that inter-process communication between the first process and the second process is authorized based on at least one of authorization data, an identifier (ID) of the second process, or a category associated with the message, wherein the buffer process acts as a central router which routes and authorizes the inter-process communications between the processes running within the isolated containers, wherein the buffer process, the first process running within the first isolated container or the second isolated container, the second process running within the third isolated container, and a third process running within one of the isolated containers form a star topology; and
communicating, by the buffer process via inter-container messaging, the message towards the second process based on the determining.

16. The non-transitory computer readable storage device of claim 15, the operations further comprising:
receiving, the buffer process, a request to update the authorization data; and
determining, the buffer process, that the request to update and
updating, by the buffer process, the authorization data based on the determining that the request to update is authorized.

17. The non-transitory computer readable storage device of claim 15, the operations further comprising:
receiving, the buffer process, a request to update the authorization data; and
updating, by the buffer process, the authorization data determining that the request is authorized.

18. The computer-implemented method of claim 1 wherein the determining that the inter-process communication is authorized is based on a combination of the first process, the second process, and the isolated containers within which the first process and the second process are running.

19. The computer-implemented method of claim 1 wherein the determining, by the buffer process, that the inter-process communication the first process and the second process is authorized comprises:
determining, by the buffer process, the category based on a source ID in the message or a type of the message;

determining, by the buffer process, at least one destination ID associated with the category; and determining, by the buffer process, that the ID of the second process running within the third isolated container matches one of the at least one destination ID.

* * * * *